(12) United States Patent
Gao et al.

(10) Patent No.: US 11,816,556 B1
(45) Date of Patent: Nov. 14, 2023

(54) METHOD FOR PREDICTING AIR QUALITY INDEX (AQI) BASED ON A FUSION MODEL

(71) Applicant: Chengdu University of Technology, Chengdu (CN)

(72) Inventors: Song Gao, Chengdu (CN); Hengsheng Zhang, Chengdu (CN); Simin Wang, Chengdu (CN); Lun Zhou, Chengdu (CN); Ruochen Liu, Chengdu (CN)

(73) Assignee: Chengdu University of Technology, Chengdu (CN)

( * ) Notice: Subject to any disclaimer, the term of this patent is extended or adjusted under 35 U.S.C. 154(b) by 0 days.

(21) Appl. No.: 18/206,100

(22) Filed: Jun. 6, 2023

(30) Foreign Application Priority Data

Feb. 8, 2023 (CN) .......................... 202310076823.1

(51) Int. Cl.
| | | |
|---|---|---|
| *G06N 3/08* | (2023.01) | |
| *G06N 3/045* | (2023.01) | |
| *G01W 1/10* | (2006.01) | |
| *G06N 3/0464* | (2023.01) | |
| *G06N 20/20* | (2019.01) | |
| *G06N 3/0442* | (2023.01) | |

(52) U.S. Cl.
CPC .............. *G06N 3/045* (2023.01); *G01W 1/10* (2013.01); *G06N 3/0442* (2023.01); *G06N 3/0464* (2023.01); *G06N 3/08* (2013.01); *G06N 20/20* (2019.01)

(58) Field of Classification Search
CPC .... G06N 3/045; G06N 3/0442; G06N 3/0464; G06N 3/08; G06N 20/20; G01W 1/10
USPC .......................................................... 706/12
See application file for complete search history.

(56) References Cited

U.S. PATENT DOCUMENTS 11,074,269 B2 * 7/2021 Ezick .................. H04L 63/1416

FOREIGN PATENT DOCUMENTS

| CN | 113240170 A | 8/2021 |
|---|---|---|
| CN | 114240000 A | 3/2022 |

OTHER PUBLICATIONS

Gao Song, et al., Application of difference fusion analysis based on machine learning in air quality prediction, Electronic Measurement Technology, 2021, pp. 85-92, vol. 44, No. 18.

(Continued)

*Primary Examiner* — Charlotte M Baker
(74) *Attorney, Agent, or Firm* — Bayramoglu Law Offices LLC

(57) ABSTRACT

A method for predicting an air quality index (AQI) based on a fusion model proposes a differential fusion seasonal prediction model (DF-SPM) based on a random forest (RF) model and a convolutional neural network (CNN)-long short-term memory (LSTM)-attention (CLA) model. This method uses the optimal threshold interval (OTI) search algorithm to search and learn the OTI of four seasons during the prediction process, and obtains the final prediction results according to the predicted values of RF model and CLA model. The fusion model combines the prediction advantages of two independent models, and fully considers the seasonal and periodic characteristics of AQI, so as to accurately search OTI in different time periods with the seasonal scale, so as to achieve higher prediction accuracy. The OTI strategy of fusion model is superior to the single threshold strategy, which can extract the historical fluctuation characteristics of AQI and achieve higher prediction accuracy.

5 Claims, 7 Drawing Sheets

(56) References Cited

OTHER PUBLICATIONS

Zhang Bo, et al., A Multi-Site Joint Air Pollution Prediction Model Based on Convolutional Auto-Encoder Deep Learning, Acta Electronica Sinica, 2022, pp. 1410-1427, vol. 50, No. 6.

* cited by examiner

METHOD FOR PREDICTING AIR QUALITY INDEX (AQI) BASED ON A FUSION MODEL

CROSS REFERENCE TO THE RELATED APPLICATIONS

This application is based upon and claims priority to Chinese Patent Application No. 202310076823.1, filed on Feb. 8, 2023, the entire contents of which are incorporated herein by reference.

TECHNICAL FIELD

The present disclosure belongs to the technical field of air pollution, and particularly relates to a method for predicting an air quality index (AQI) based on a fusion model.

BACKGROUND

In recent years, severe air pollution episodes in China have received increasing attention due to their negative impacts. In this context, studying the related issues in the field of air quality and seeking pollution control measures has become an important topic for the harmonious development of human and nature.

The air quality index (AQI) is a dimensionless indicator that quantitatively describes air quality. It can be used to intuitively evaluate the level of air pollution and plays a crucial role in preventing and reducing air pollution. In China, AQI is divided into six levels (I to VI), corresponding to six air quality categories. A higher level and value of AQI indicates a higher concentration of pollutants in the air, a greater harm to people's health, and a lower level of human comfort. AQI prediction can provide valuable theoretical basis for reducing environmental pollution and providing warnings to travelers. However, the atmosphere is a complex multi-level system influenced by human activities and meteorological factors, which make it difficult to ensure the accuracy of AQI prediction. To address the difficulties in predicting AQI and air pollutants, some statistical models and machine learning (ML) models are proposed.

At present, there are three types of AQI prediction methods using ML models.

(1) An AQI prediction method using a gated unit-based recurrent neural network (RNN) according to air quality and meteorological data. This method uses a single model, which cannot effectively process the temporal sequence, and is thus unable to improve the prediction accuracy. In addition, during the prediction process, this method only considers the dependencies between temporal sequence data, without considering the spatial feature of the AQI sequence. This method has weak generalization ability and insufficient prediction performance for different region predictions, so it cannot be applied to multi-region detection and its practicality is limited. Furthermore, this method is limited to short-term prediction and cannot achieve long-term prediction of AQI sequence.

(2) An AQI prediction method combining an attention-based graph convolutional network (GCN) and a long short-term memory (LSTM) network. There is a contradiction between the network training and prediction ability of this method, which can easily lead to over-fitting. When the limit is reached, the prediction ability will decrease with the improvement of the training ability. In addition, the number of layers in the network model is limited, and the effectiveness of feature extraction and weight allocation may be poor, thereby limiting the improvement of prediction accuracy. In addition, the two models involve input variables with a large number of parameters, resulting in great operational pressure in the prediction process.

(3) An AQI prediction method based on a convolutional neural network (CNN), a gated recurrent unit (GRU), and an attention mechanism. Like the aforementioned method, this method only considers the dependencies between temporal sequence data, without considering the spatial feature of the AQI sequence. This method has weak generalization ability and insufficient prediction performance for different region predictions, so it cannot be applied to multi-region detection and its practicality is limited. In addition, this method is limited to short-term prediction and cannot achieve long-term prediction of AQI sequence.

SUMMARY

In order to address the aforementioned shortcomings in the prior art, the present disclosure provides a method for predicting an air quality index (AQI) based on a fusion model. The present disclosure solves the following problems arising in the existing prediction methods. The existing prediction methods use a single model, have low prediction accuracy, are vulnerable to various random factors in the prediction process, and do not fully consider the temporal and spatial features of the AQI, making the prediction model limited to specific regions and short-term prediction.

To achieve the above objective, the present disclosure adopts the following technical solution. A method for predicting an AQI based on a fusion model includes the following steps:

S1: acquiring and preprocessing historical air quality data; where, the air quality data includes an AQI and a pollutant indicator;

S2: building a differential fusion seasonal prediction model (DF-SPM), training the DF-SPM based on the historical air quality data, and determining an optimal threshold interval (OTI) of the AQI in each season; where, the DF-SPM includes a random forest (RF) model and a convolutional neural network (CNN)-long short-term memory (LSTM)-attention (CLA) model that are parallel to each other; and S3: taking the pollutant indicator before a predicted day as an input into the DF-SPM, taking a predicted AQI of the RF model or the CLA model as an output from the DF-SPM based on the OTI of the AQI in the season of the predicted day, and acquiring an AQI prediction result of the predicted day.

The present disclosure has the following beneficial effects.

The present disclosure combines two prediction models and achieves accurate AQI prediction based on the optimal choice strategy. The present disclosure specifically has the following beneficial effects.

(1) The disclosure solves the problem of low prediction accuracy of a single model. The present disclosure can effectively extract useful information from a single prediction model in sample prediction, and comprehensively utilizes the advantages of the CLA model and the RF model to improve the prediction accuracy of the fusion model. This fusion model provides two types of model predictions, increasing fault tolerance of the model and reducing the susceptibility of the CLA model or the RF model alone to various random factors, thereby improving the prediction accuracy of the fusion model.

(2) The present disclosure reduces the parameters of the DF-SPM, and introduces dropout and attention mechanisms in the design of the CLA model, paying sufficient attention to key information in the data. In this way, the present disclosure improves the prediction efficiency of the fusion model, reduces the convolution calculation pressure and the computational power requirement for model operation.

(3) The present disclosure is a long-term AQI prediction method suitable for multi-region prediction. The present disclosure effectively utilizes the difference in prediction performance between the RF model and the CLA model to implement fusion prediction, which is suitable for predicting multiple spatial sites with different AQI levels. In addition, the present disclosure implements seasonal prediction by fully considering the seasonal features of the AQI, ensuring the performance of the fusion model in long-term prediction.

(4) The present disclosure takes into account the significant changes of the AQI in the four seasons, and divides the annual data into four segments of temporal sequence data on a seasonal scale in order for best OTI for different seasons. In the past, a model fusion strategy using a single-threshold method was greatly affected by AQI fluctuations, and it was hard to search for an optimal solution or the optimal solution often could not accurately determine a final AQI prediction result. In contrast, the present disclosure effectively solves this problem through the optimal threshold interval and improves prediction accuracy.

BRIEF DESCRIPTION OF THE DRAWINGS

FIGS. 3A-3D show MAEs in winter, spring, summer, and autumn, respectively;

FIGS. 4A-4C show seasonal average AQIs in 2019, 2020, and 2021, respectively;

DETAILED DESCRIPTION OF THE EMBODIMENTS

The specific implementations of the present disclosure are described below to facilitate those skilled in the art to understand the present disclosure, but it should be clear that the present disclosure is not limited to the scope of the specific implementations. Various obvious changes made by those of ordinary skill in the art within the spirit and scope of the present disclosure defined by the appended claims should fall within the protection scope of the present disclosure.

Embodiment 1

Figure 1:
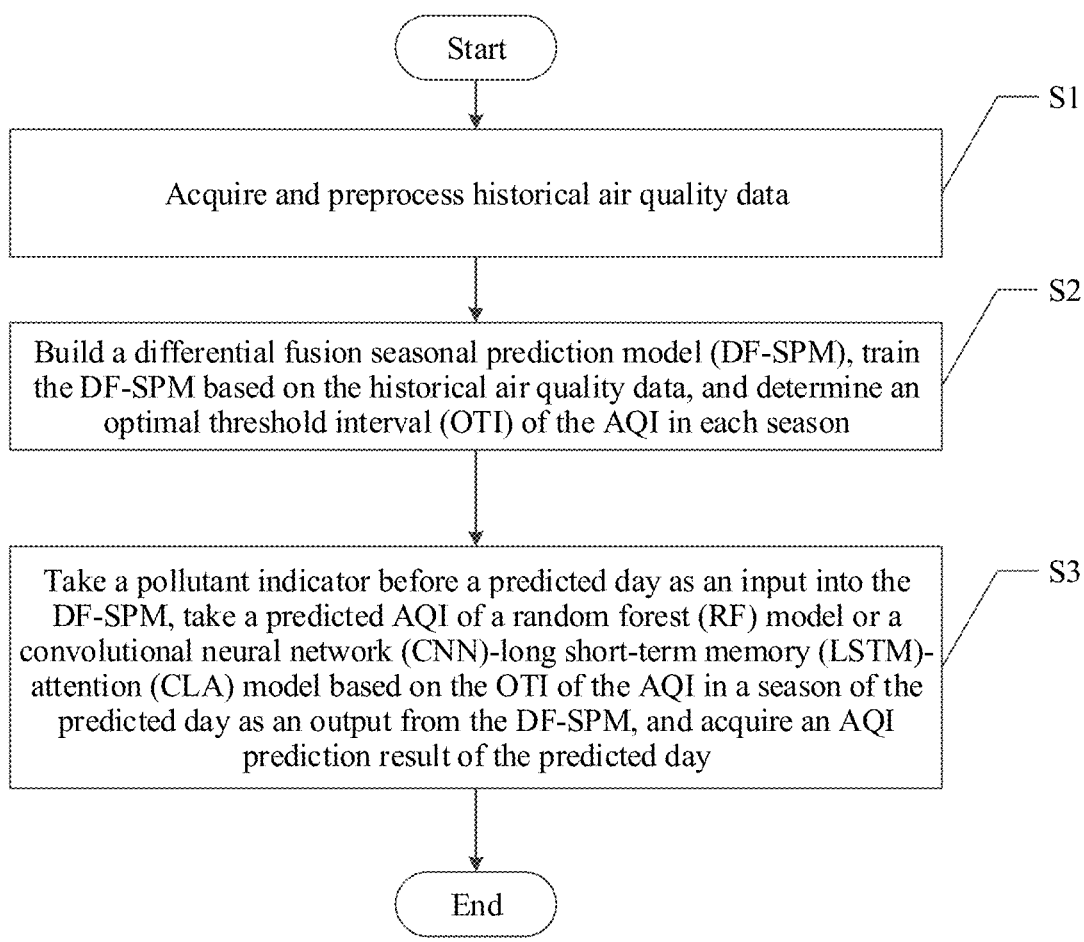
FIG. 1 is a flowchart of a method for predicting an air quality index (AQI) based on a fusion model according to the present disclosure.

This embodiment provides a method for predicting an air quality index (AQI) based on a fusion model. As shown in FIG. 1, the method includes the following steps.

S1. Historical air quality data are acquired and preprocessed.

The air quality data includes an AQI and a pollutant indicator.

S2. A differential fusion seasonal prediction model (DF-SPM) is built, the DF-SPM is trained based on the historical air quality data, and an optimal threshold interval (OTI) of the AQI in each season is determined.

The DF-SPM includes a random forest (RF) model and a convolutional neural network (CNN)-long short-term memory (LSTM)-attention (CLA) model that are parallel to each other.

S3. The pollutant indicator before a predicted day is taken as an input into the DF-SPM, a predicted AQI of the RF model or the CLA model is taken as an output from the DF-SPM based on the OTI of the AQI in the season of the predicted day, and an AQI prediction result of the predicted day is acquired.

In this embodiment, in step S1, the pollutant indicator includes daily average monitored concentration data of CO, $NO_2$, $O_3$, PM10, PM2.5, and $SO_2$.

In Step S1, the historical air quality data are preprocessed to complete missing data.

When air quality data of consecutive i days is missing, average value $X_{AVG}$ of air quality data of previous i days and next i days is taken as the missing data $X_M$, where $X_M = X_{AVG}/2$ when i=1, and $$X_M = (X_{M-1} + X_{AVG})/2 \text{ when } 2 \le i \le 5; X_{AVG} = \frac{\sum_{n-i}^{n-1} X_P + \sum_{n+i}^{n+2i-1} X_N}{2i};$$

$X_P$ denotes the air quality data of the previous i days; $X_N$ denotes the air quality data of the next i days; M=n, . . . , n+i−1; P=n−i, . . . , n−1; and N=n+i, . . . , n+2i−1.

In this embodiment, in step S2, the air quality data of previous 7 days are input into the RF model and the CLA model, and the AQI of a next day is output from the RF model and the CLA model.

In this embodiment, the RF model is an ensemble supervised learning algorithm. The RF model based on ensemble learning can prevent over-fitting, and has low modeling difficulty, low cost, and stable and effective prediction results. In this embodiment, the RF model has higher accuracy compared to traditional learning models such as naïve Bayes, logistic regression, single decision tree, and artificial neural network (ANN).

The RF model uses a decision tree as a model in a bootstrap aggregating (bagging) algorithm. Firstly, m training sets are generated by using a bootstrap method. Then, a decision tree is built for each training set. When searching for a feature at a node for splitting, it is not required to find an optimal solution for all features that maximizes an indicator (such as information gain). Instead, the optimal solution is found based on a portion of randomly extracted features, and is applied to the node for splitting. The RF model uses the bagging method, that is, the ensemble idea. It is equivalent to sampling both the sample and feature, so over-fitting can be avoided.

Figure 2:
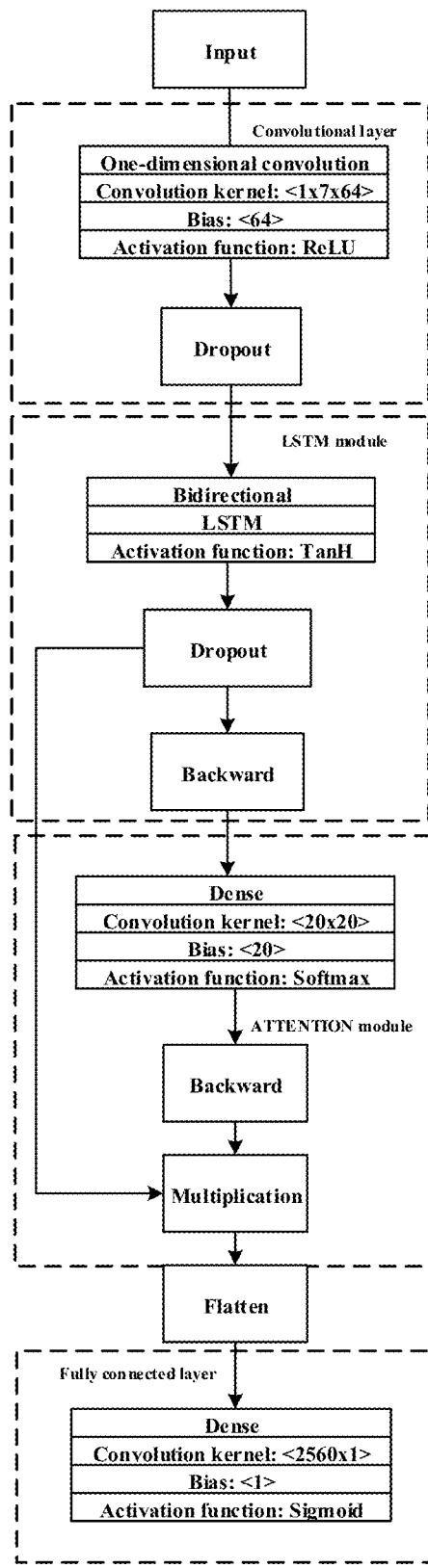
FIG. 2 is a schematic diagram of a convolutional neural network (CNN)-long short-term memory (LSTM)-attention (CLA) model according to the present disclosure.
Figure 3A:
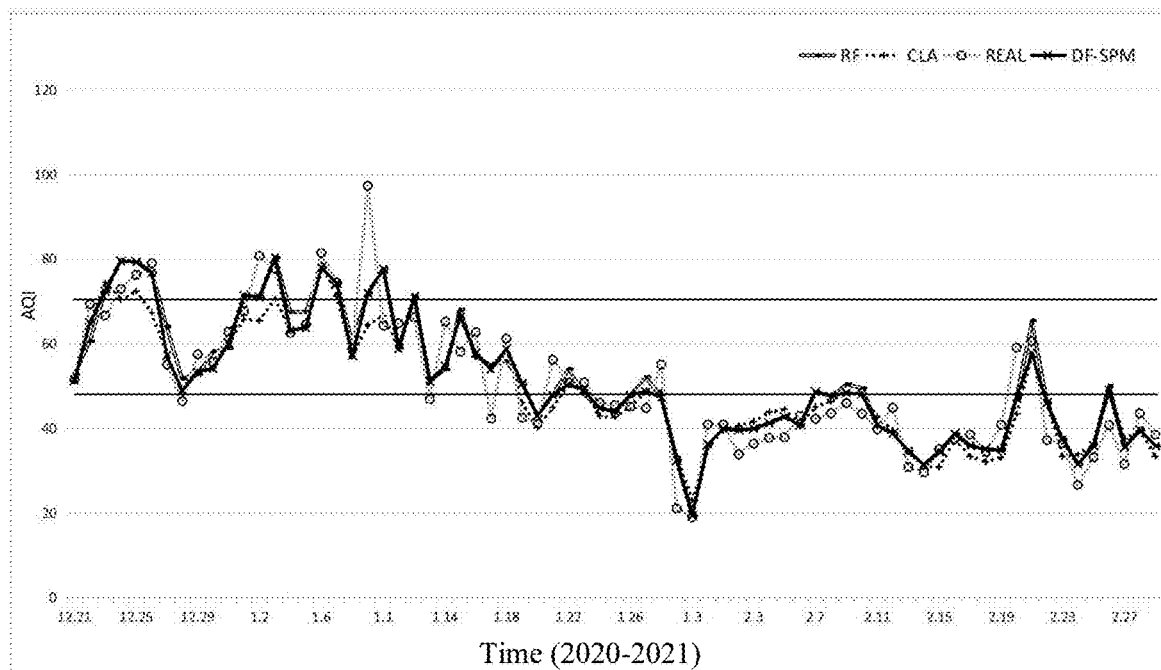
FIGS. 3A-3D are comparison diagrams of mean absolute errors (MAEs) for predictions of AQIs in Zhuhai, China by a differential fusion seasonal prediction model (DF-SPM) and baseline models according to the present disclosure, where
Figure 3B:
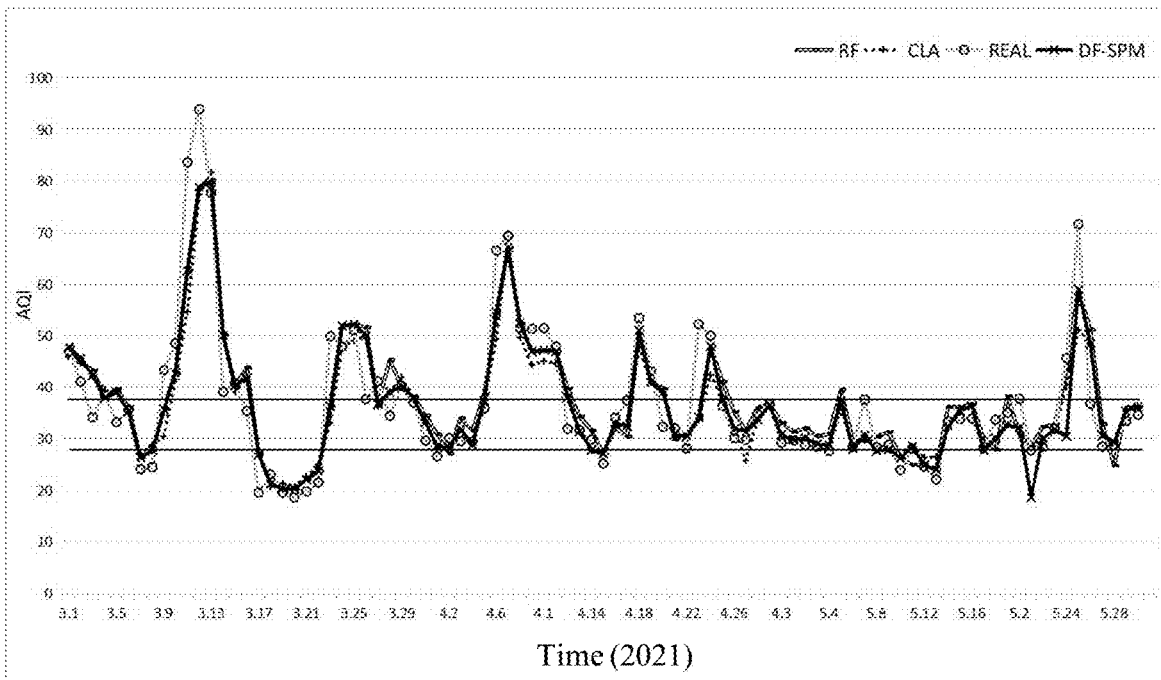
Figure 3C:
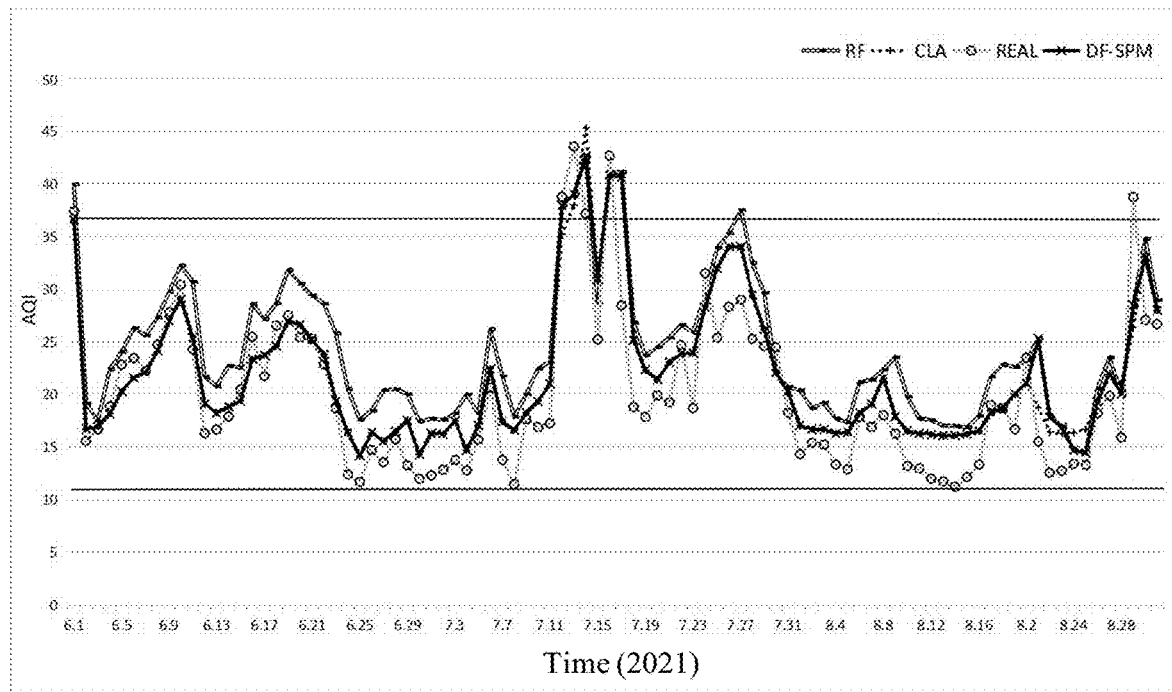
Figure 3D:
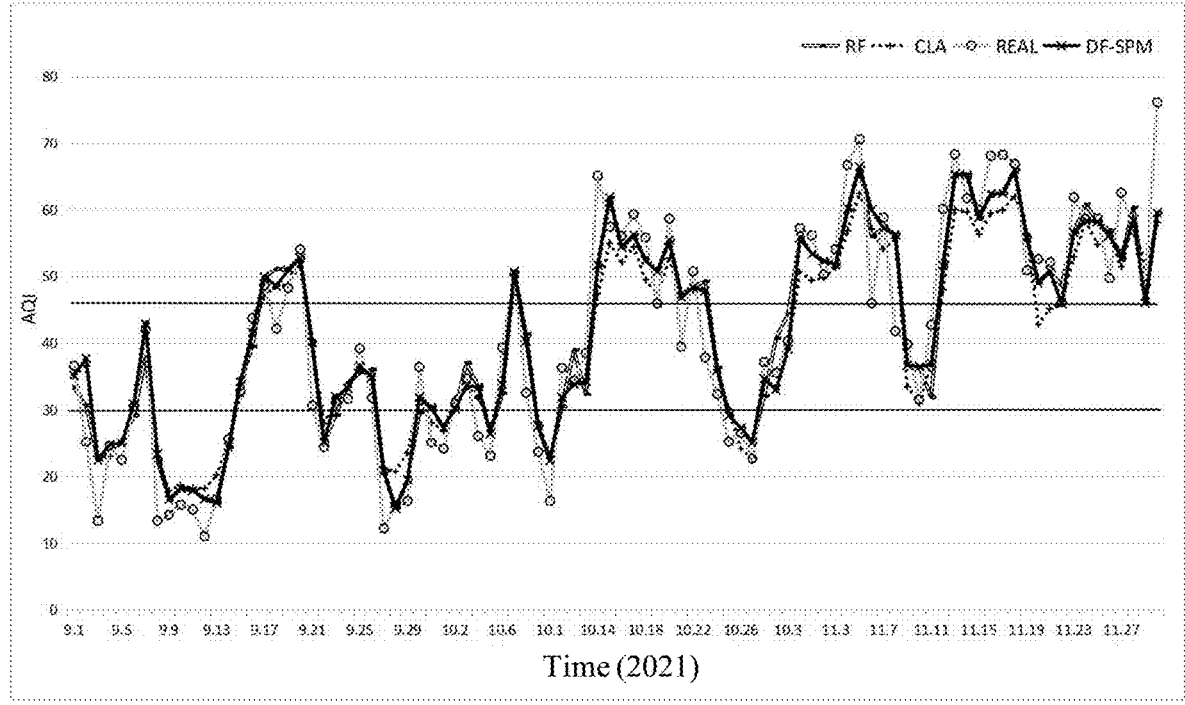

In this embodiment, as shown in FIG. 2, the CLA model includes a CNN module, an LSTM module, an ATTENTION module, and a fully connected layer that are sequentially connected.

The CNN module is configured to extract a feature of input data and flatten the feature into a one-dimensional temporal sequence. The LSTM module is configured to analyze a feature of an input temporal sequence. The ATTENTION module is configured to analyze and highlight key information in the feature of the input temporal sequence. In this embodiment, the CLA model further introduces a dropout mechanism to prevent over-fitting during model training.

Specifically, in this embodiment, the CNN module is further configured to output a temporal sequence:

$$x_{i,j}^{out} = f_{cov}\left(\sum_{m=0}^{k}\sum_{n=0}^{k} w_{m,n} x_{i+m,j+n}^{in} + b\right)$$

$x_{i,j}^{out}$ denotes a value in an i-th row and a j-th column of the output temporal sequence. $x_{i+m,j+n}^{in}$ denotes a value in an i-th row and a j-th column of an input 7×7 matrix. $f_{cov}(\bullet)$ denotes a rectified linear unit (ReLU) activation function. $w_{m,n}$ denotes a weight in an m-th row and a n-th column of a convolution kernel. b denotes a bias of the convolution kernel. The ReLU activation function is expressed as ReLU=max (0,x).

In this embodiment, in the CNN module, 64 1×7 one-dimensional convolution kernels are used to perform convolution operation on the input data, and dropout operation is performed. Each one-dimensional convolution kernel extracts a feature from the input matrix and generates one-dimensional feature vector $x_{i,j}^{out}$.

In this embodiment, the LSTM module is a bidirectional LSTM (Bi-LSTM), which also introduces the dropout operation. A drawback of a traditional LSTM is that it can only utilize the previous context of sequence data. In contrast, the Bi-LSTM can simultaneously process the temporal sequence data in two directions through two independent hidden layers. These data are cascaded and forwarded to an output layer. This approach can provide additional context for the network and achieve faster and more comprehensive learning. Based on this, in this embodiment, the LSTM module is configured to analyze the input temporal sequence:

$$\vec{i}_t = \sigma(\vec{U}^{(i)}\vec{x}_t + \vec{W}^{(i)}\vec{h}_{t-1} + \vec{b}_i)$$

$$\vec{f}_t = \sigma(\vec{U}^{(f)}\vec{x}_t + \vec{W}^{(f)}\vec{h}_{t-1} + \vec{b}_f)$$

$$\vec{o}_t = \sigma(\vec{U}^{(o)}x_t + \vec{W}^{(o)}\vec{h}_{t-1} + \vec{b}_o)$$

$$\vec{\tilde{s}}_t = \tanh(\vec{U}^{(c)}\vec{x}_t + \vec{W}^{(c)}\vec{h}_{t-1} + \vec{b}_c)$$

$$\vec{s}_t = \vec{f}_t \cdot \vec{s}_{t-1} + \vec{i}_t \cdot \vec{\tilde{s}}_t$$

$$\vec{h}_t = \vec{o}_t \cdot \tanh(\vec{s}_t)$$

$$\overleftarrow{i}_t = \sigma(\overleftarrow{U}^{(i)}\overleftarrow{x}_t + \overleftarrow{W}^{(i)}\overleftarrow{h}_{t-1} + \overleftarrow{b}_i)$$

$$\overleftarrow{f}_t = \sigma(\overleftarrow{U}^{(f)}\overleftarrow{x}_t + \overleftarrow{W}^{(f)}\overleftarrow{h}_{t-1} + \overleftarrow{b}_f)$$

$$\overleftarrow{o}_t = \sigma(\overleftarrow{U}^{(o)}\overleftarrow{x}_t + \overleftarrow{W}^{(o)}\overleftarrow{h}_{t-1} + \overleftarrow{b}_o)$$

$$\overleftarrow{\tilde{s}}_t = \tanh(\overleftarrow{U}^{(c)}\overleftarrow{x}_t + \overleftarrow{W}^{(c)}\overleftarrow{h}_{t-1} + \overleftarrow{b}_c)$$

-continued $$\overleftarrow{s}_t = \overleftarrow{f}_t \cdot \overleftarrow{s}_{t-1} + \overleftarrow{i}_t \cdot \overleftarrow{\tilde{s}}_t$$

$$\overleftarrow{h}_t = \overleftarrow{o}_t \cdot \tanh(\overleftarrow{s}_t)$$

$$h_t = \vec{h}_t \cdot \overleftarrow{h}_t$$

Left and right arrows on parameters indicate forward and backward directions of the input temporal sequence, respectively. In the forward direction, the LSTM module uses forget gate $f_t$, input gate $i_t$, and output gate $o_t$ to control long-term state S. S decides what information to be preserved or forgotten. $x_t$ denotes an expression of the output $x_{i,j}^{out}$ from the CNN module in the LSTM module. $i_t$ denotes the input gate, which decides an amount of information to be input or output at a next time step. $\sigma(\bullet)$ denotes a Sigmoid activation function. $U^{(i)}$, $W^{(i)}$ denote a weight matrix of an input into the input gate at a current moment and a weight matrix of an output from the input gate at a previous moment, respectively. $h_{t-1}$ denotes an output result at the previous moment. $b_i$ denotes a bias of the input gate. $f_t$ denotes the forget gate, which decides how much of current state $S_t$ is input from previous state $S_{t-1}$ and what information decided by $f_t$ and $S_{t-1}$ to discard. $U^{(f)}$, $W^{(f)}$ denote a weight matrix of an input into the forget gate at a current moment and a weight matrix of an output from the forget gate at a previous moment, respectively. $b_f$ denotes a bias of the forget gate. $O_t$ denotes the output gate. $U^{(o)}$ $W^{(o)}$ denote a weight matrix of an input into the output gate at a current moment and a weight matrix of an output from the output gate at a previous moment, respectively. $b_o$ denotes a bias of the output gate. $\tilde{S}_t$ denotes a neuron, which has a self-cycle cell like a recurrent neural network (RNN). tanh(•) denotes an activation function. $U^{(c)}$, $W^{(c)}$ denote a weight matrix of an input in a self-cycle state at a current moment and a weight matrix of an output in the self-cycle state at a previous moment, respectively. $b_c$ denotes a bias of the self-cycle state. $S_t$ denotes a current state of the output gate in the LSTM module. $h_t = \vec{h}_t \cdot \overleftarrow{h}_t$ denotes a final hidden element of the LSTM module, which is a connection vector between a forward output and a backward output.

In this embodiment, the ATTENTION module is embedded in a temporal sequence feature analysis process of the LSTM module, and is configured to highlight the key information in the feature of the temporal sequence by a Softmax activation function.

Based on the above process, the forward and backward output results of the LSTM module are connected through multiplication to form the feature of the temporal sequence output by the LSTM module. A mapping relationship is $$Bi-LSTM(\overleftarrow{x}_{i,j}^{out}, \vec{x}_{i,j}^{out}) \rightarrow S_t$$

where $S_t$ denotes the feature of the temporal sequence derived by the Bi-LSTM.

Finally, the feature of the temporal sequence is flattened into a one-dimensional feature, $Q_t$=flatten($S_t$), and $Q_t$ is connected to the fully connected layer (the activation function is Sigmaid) to get the final output of the CLA model.

In this embodiment, in step S2, the DF-SPM is specifically trained as follows.

S2-1. Preprocessed data are divided into a training set and a test set.

S2-2. The RF model and the CLA model are trained separately based on the training set.

S2-3. AQI predictions are performed on the test set respectively by the trained RF model and the trained CLA model, and corresponding prediction results are acquired.

S2-4. The prediction result of the RF model, the prediction result of the CLA model, and real AQI data in the test set are classified on a seasonal scale.

S2-5. Based on data of each season, the OTI of the AQI in each season is determined by an OTI search method.

In this embodiment, in Step S2-1, a model parameter corresponding to the minimum MAE is taken as an optimal parameter for the RF model or the CLA model when the RF model or the CLA model is trained.

In this embodiment, the MAE is taken as a measure to determine the optimal parameter of the RF model corresponding to the minimum MAE through random search. Random search refers to sampling search in a parameter space in a random manner. Random search involves distributed sampling on the parameter of a continuous variable. After sampling is completed, cross validation (CV) is performed. By comparing the accuracy of each trainer under the set parameter, the optimal parameter is finally selected. During training, a maximum depth of an initial tree is set to 20. When branching is allowed, a minimum number of training samples that a node must include is set to 20. A minimum number of training samples for a sub-node after branching is set to 5.

In this embodiment, the CLA model is trained using an adaptive movement estimation (Adma) optimizer, with an initial learning rate set to 0.001. Similarly, MAE is taken as a measure to evaluate model training (i.e. a loss function of the model).

In this embodiment, the MAE is calculated as follows:

$$MAE = \frac{1}{N}\sum_{i=1}^{N}|y_i - \hat{y}_i|$$

$y_i$ denotes an actual value of the AQI on an i-th day, and $\hat{y}_i$ denotes a predicted value of the AQI on the i-th day.

In this embodiment, in step S2-5, the OTI of the AQI in any season is determined as follows:

S2-51. A threshold interval [Down,Up] is initialized, and a maximum threshold interval and a change step size are set, where Down denotes a minimum value of the threshold interval, and Up denotes a maximum value of the threshold interval.

S2-52. The prediction result $B_i^{RF}$ of the RF model, the prediction result $B_i^{CLA}$ of the CLA model, and the real AQI data in the test set in a same season are traversed.

The prediction result $B_i^{CLA}$ of the CLA model is taken as a current model prediction result when the prediction result $B_i^{RF}$ of the RF model and the prediction result $B_i^{CLA}$ of the CLA model are both inside a current threshold interval.

The prediction result $B_i^{RF}$ of the RF model is taken as the current model prediction result when the prediction result $B_i^{RF}$ of the RF model and the prediction result $B_i^{CLA}$ of the CLA model are both larger than Up or smaller than Down.

S2-53. The current model prediction result is stored in prediction set $R_{Season}$ within the current threshold interval, a mean absolute error (MAE) of the prediction set $R_{Season}$ is calculated after the traversing, and the MAE is stored in set $MAE_{Season}^{DF-SPM}$.

S2-54. The threshold interval is modified according to the set change step size, and the operation returns to step S2-52 until the maximum threshold interval is met.

S2-55. A minimum MAE in the set $MAE_{Season}^{DF-SPM}$ is selected, and a threshold interval corresponding to the minimum MAE is taken as the OTI of the AQI in a current season.

In this embodiment, in step S3, after the OTI of the AQI in each season is determined, a selection is made based on a known seasonal OTI to generate the final output of the DF-SPM. That is, by comparing the daily predicted values of the RF model and the CLA model inside/outside the OTI, one of the predicted values of the RF model and the CLA model is selected as the prediction result for the day. Based on this, in this embodiment, step S3 further includes determining the output from the DF-SPM as follows.

When the predicted AQI of the RF model and the predicted AQI of the CLA model are both inside the OTI of the AQI, the predicted AQI of the CLA model is taken as the output from the DF-SPM.

When the predicted AQI of the RF model and the predicted AQI of the CLA model are both outside the OTI of the AQI, the predicted AQI of the RF model is taken as the output from the DF-SPM.

When one of the predicted AQI of the RF model and the predicted AQI of the CLA model is inside the OTI of the AQI and the other thereof is outside the OTI of the AQI, a model confidence is calculated based on an AQI change feature in a region corresponding to the predicted day, and a predicted AQI with a higher model confidence is taken as the output from the DF-SPM.

Embodiment 2

In this embodiment, AQI predictions are conducted through the model provided in Embodiment 1 and single models (the RF model and the CLA model), and the prediction results are compared.

FIGS. 3A-3D show long-term predictions of the DF-SPM of the present disclosure on daily AQI data in Zhuhai, China from 2020 to 2021. For a more intuitive and clear data analysis, FIGS. 3A-3D show the prediction processes in four seasons, namely winter, spring, summer, and autumn. An optimal threshold search method is used to acquire the OTI of the AQI in advance, that is, [44,70] in winter, [28,38] in spring, [12,38] in summer, and [30,46] in autumn. Furthermore, the MAEs of prediction points of the three models inside/outside the OTI in each season are calculated and classified (Table 1).

In each graph shown in FIGS. 3A-3D, inside the OTI, the daily predicted value of the AQI output by the DF-SPM is the same as that output by the CLA model. On the contrary, outside the OTI, the daily predicted value of the AQI output by the DF-SPM is the same as that output by the RF model. The prediction result of the DF-SPM in each season is formed by fusing the prediction results of the RF model and the CLA model. Therefore, the DF-SPM provided by the present disclosure is a novel prediction model that operates based on seasonal prediction and multi-model fusion prediction.

TABLE 1

Classification of MAEs at prediction points of three models inside and outside the OTI in each season

| Model | Winter | | | Spring | | | Summer | | | Autumn | | | Annual |
|---|---|---|---|---|---|---|---|---|---|---|---|---|---|
| | Outside | Inside | Overall | Outside | Inside | Overall | Outside | Inside | Overall | Outside | Inside | Overall | |
| RF | 4.622 | 5.965 | 5.640 | 5.759 | 3.041 | 4.197 | 5.011 | 4.406 | 4.716 | 4.158 | 5.641 | 4.449 | 5.380 |
| CLA | 5.368 | 4.388 | 5.611 | 6.009 | 2.097 | 4.422 | 5.066 | 2.773 | 2.932 | 5.143 | 4.189 | 4.912 | 4.702 |
| DF-SPM | 4.366 | 4.61 | 4.850 | 5.602 | 2.146 | 3.727 | 4.138 | 2.740 | 2.881 | 4.130 | 4.109 | 4.036 | 4.405 |

According to FIGS. 3A-3D, for most prediction points of the DF-SPM, the optimal predicted value is successfully selected based on the OTI. From the data perspective, the MAEs of the DF-SPM are smaller than those of the RF model and the CLA model on the annual and seasonal scales. Furthermore, according to Table 1, in the same season, the MAEs at the prediction points of the CLA model inside the OTI are smaller than those of the RF model, but the MAEs at the prediction points of the RF model outside the OTI are smaller than those of the CLA model. This fully conforms to the prediction performance difference feature of the baseline models. The MAEs at the prediction points of the DF-SPM inside and outside the OTI are both approximate to the best MAE data of the two baseline models. Finally, the MAE of the DF-SPM in Zhuhai for the entire year decreased by 6.3% compared to the CLA model and 18.12% compared to the RF model. This indicates that the OTI-based prediction mechanism obtained through the optimal threshold interval search algorithm (OTISA) effectively utilizes the advantages of different models and achieves a desired fusion prediction result.

Embodiment 3

In this embodiment, the AQIs of 264 cities in China are predicted through the model provided in Embodiment 1, and the prediction results are evaluated.

This embodiment aims to obtain the universality of the DF-SPM. In this embodiment, the air quality data of the 264 cities are acquired, the spatial and temporal features of the air quality data of the 264 cities are analyzed by a clustering analysis method, and long-term predictions of the AQIs of these cities are performed by the model provided in Embodiment 1.

In this embodiment, the spatial and temporal features of the data samples are analyzed. In the analysis of the spatial feature, an overall average AQI and averages of six pollutants of data samples from the 264 study cities are calculated as variables characterizing air quality. A K-means clustering algorithm is used to cluster the air quality of the 264 cities located in different spatial regions in China. The clustering results are shown in Table 2.

TABLE 2

Clustering results of air quality in 264 cities in China

| No. | Number of cities | Representative city | Province, municipality or autonomous region | Name of region |
|---|---|---|---|---|
| Region-1 | 25 | Jinan | Beijing, Tianjin, Hebei Province, and Shandong Province | Northern Coastal Region |
| Region-2 | 40 | Linfen | Shaanxi Province, Shanxi Province, Henan Province, and Inner Mongolia Autonomous Region | Middle Reach of the Yellow River |
| Region-3 | 31 | Dalian | Liaoning Province, Jilin Province, and Heilongjiang Province | Northeast Region |
| Region-4 | 26 | Lhasa | Gansu Province, Qinghai Province, Ningxia Hui Autonomous Region, Tibet Autonomous Region, and Xinjiang Uygur Autonomous Region | Northwest Region |
| Region-5 | 44 | Changde | Hubei Province, Hunan Province, Jiangxi Province, and Anhui Province | Middle Reach of the Yangtze River |
| Region-6 | 52 | Zunyi | Yunnan Province, Guizhou Province, Sichuan Province, Chongqing City, and Guangxi Zhuang Autonomous Region | Southwest Region |
| Region-7 | 22 | Ningbo | Shanghai, Jiangsu Province, and Zhejiang Province | Eastern Coastal Region |
| Region-8 | 24 | Zhuhai | Fujian Province, Guangdong Province, and Hainan Province | Southern Coastal Region |

Figure 4A:
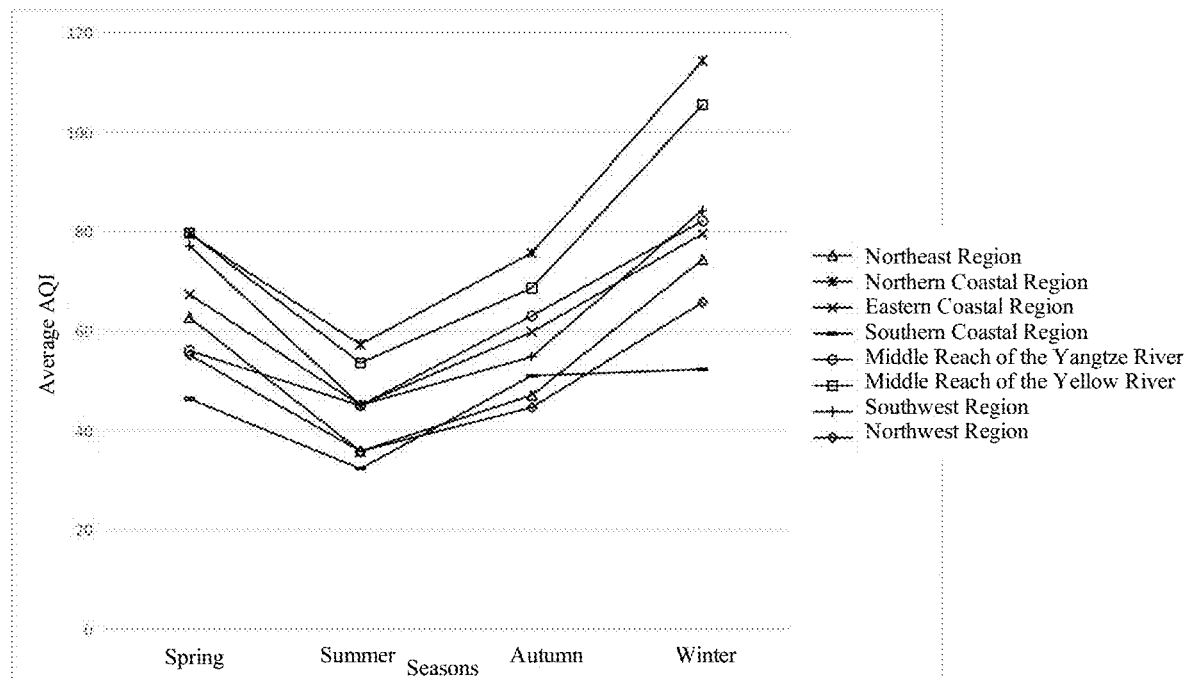
FIGS. 4A-4C show seasonal average AQIs in 8 regions in China in different years according to the present disclosure, where
Figure 4B:
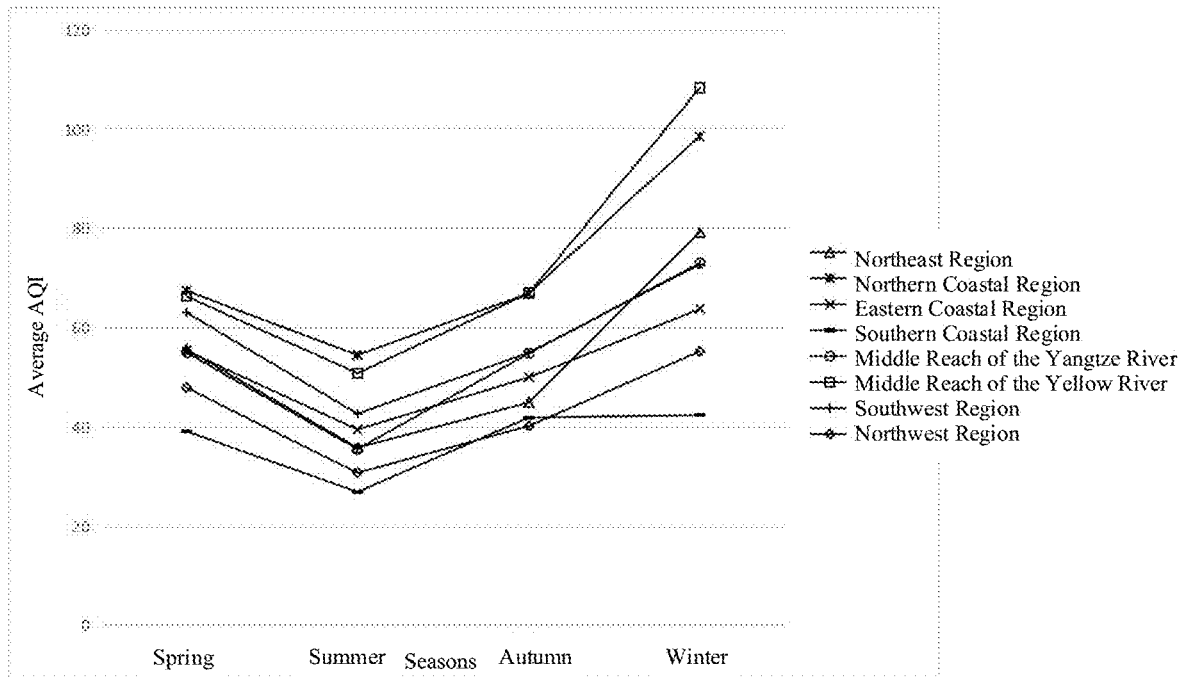
Figure 4C:
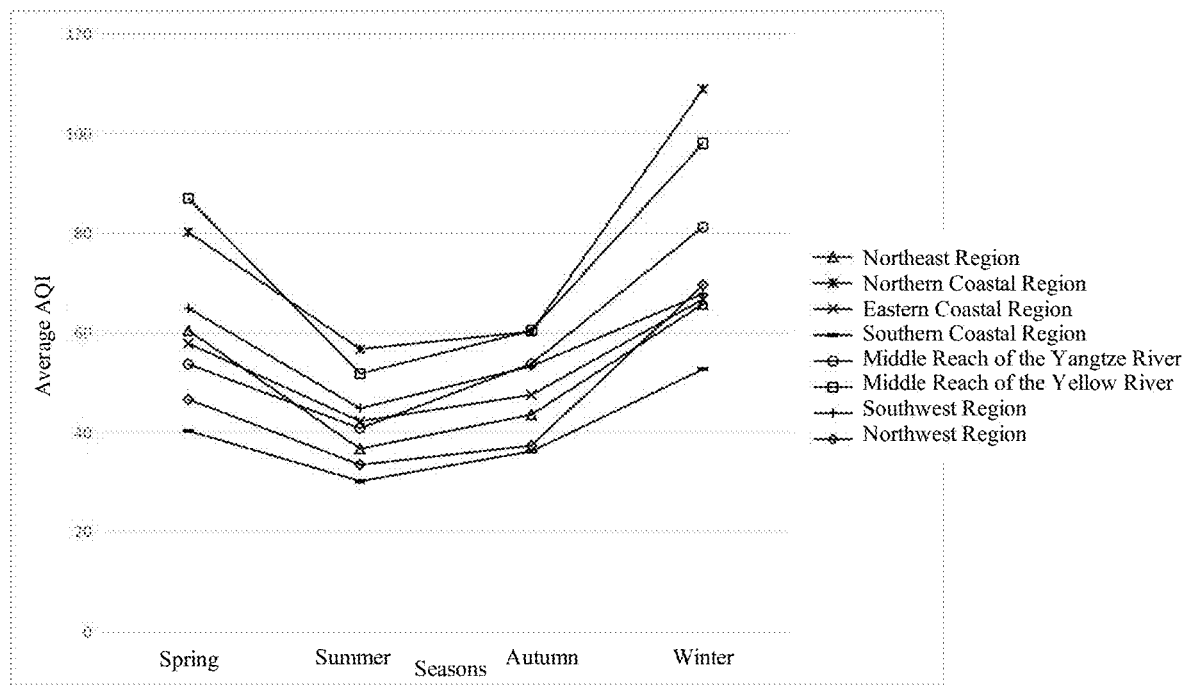

In this embodiment, in the analysis of the temporal feature, the temporal distribution feature of air quality in the cities of eight regions is analyzed. China is located in the Northern Hemisphere and has four seasons: winter (from December to February of the following year), spring (from March to May), summer (from June to August), and autumn (from September to November). The annual AQI data of all the cities in each region are divided according to the four seasons, and the average AQI in each season is calculated separately. A broken line connects the average AQIs in the four seasons to form the overall trend of AQI changes on an annual basis. The analysis results are shown in FIGS. 4A-4C, which show the variation curves of seasonal average AQIs from 2019 to 2021.

In this way, the spatial and temporal distribution features of the study regions are derived as follows. In the spatial dimension, there are significant differences in the air quality levels of 8 different clusters, with the air quality levels ranging in ascending order in the Northern Coastal Region, the Middle Reach of the Yellow River, the Northeast Region, the Northwest Region, the Middle Reach of the Yangtze River, the Southwest Region, the Eastern Coastal Region, and the Southern Coastal Region (Region-1 to Region-8). In addition, cities in the same region have similar air quality performance, and have similarity in air quality data representation.

In the temporal dimension, the average AQIs of the cities in these regions from 2019 to 2021 have obvious features. That is, the seasonal average AQIs cycle annually, decreasing from spring to summer, stabilizing in summer and autumn, and sharply rising in winter after autumn. The overall trend of the seasonal average AQIs shows a tilted bathtub shape with low left and high right.

Based on the analysis results of the spatial and temporal features of the 264 cities mentioned above, a baseline test and ablation test are conducted on the prediction model proposed by the present disclosure.

Figure 5:
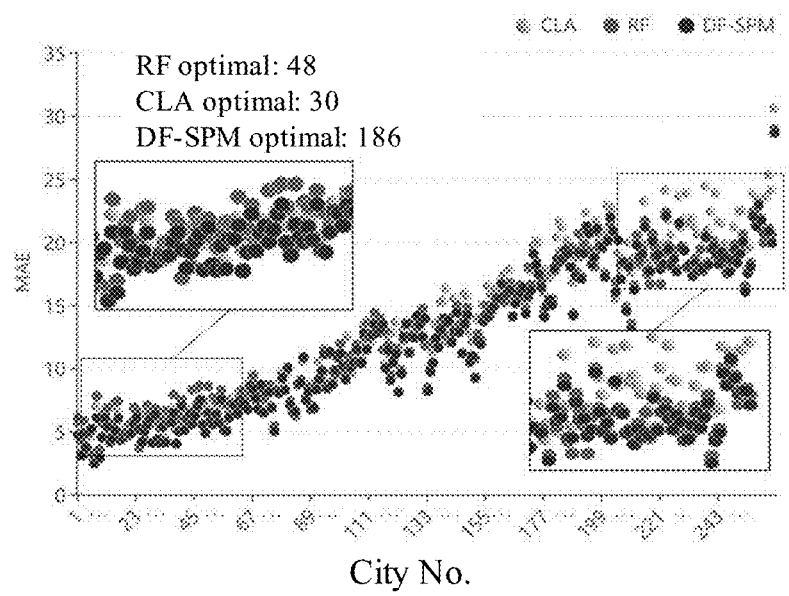
FIG. 5 is a comparison diagram of MAEs for predictions of AQIs in 264 cities in China by the DF-SPM and baseline models according to the present disclosure.
Figure 6:
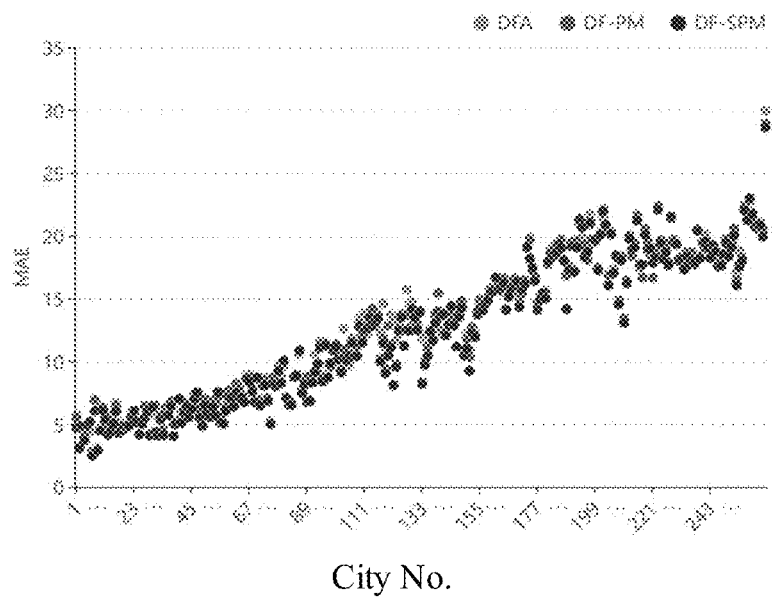
FIG. 6 is a comparison diagram of MAEs for predictions of AQIs in the 264 cities in China by the DF-SPM and ablation models according to the present disclosure.

The MAEs of the prediction results output by the DF-SPM and the baseline models RF and CLA for the test set of the 264 cities are plotted, as shown in FIG. 5. The MAEs of the prediction results output by the DF-SPM and ablation models differential fusion analysis (DFA) and differential fusion prediction model (DF-PM) for the test set of the 264 cities are plotted, as shown in FIG. 6. The abscissa denotes the 264 cities, arranged based on the annual average AQIs of the test set in ascending order. The ordinate denotes the MAEs. The comparative statistical results of the MAEs of the DFA, DF-PM, DF-SPM, RF, and CLA models are presented in Table 3.

Baseline Test Results According to FIG. 5, as the average AQI increases, the MAEs of all the models show a gradually increasing trend. For cities with a lower average AQI (rectangular box in the bottom left), all the models have lower MAEs and higher prediction accuracy, and the MAEs of the DF-SPM, CLA, and RF models are arranged in ascending order. For cities with a higher average AQI (rectangular box in the upper right), all the models have relatively larger MAEs, resulting in reduced prediction accuracy, and the MAEs of the DF-SPM, CLA, and RF models are arranged in ascending order. Therefore, for AQI prediction in regions with significant differences in air quality, the DF-SPM effectively integrates the significant differences between the RF model and the CLA model, achieving higher prediction accuracy. Overall, the black dots (the DF-SPM) are located at the lower edges of all scatter belts. From a data perspective, among the 264 cities, 186 cities present the smallest MAE of the DF-SPM, accounting for approximately 70.5%. Only 30 cities present the smallest MAE of the CLA model, accounting for approximately 11.3%. 48 cities present the smallest MAE of the RF model, accounting for approximately 18.2%. The baseline test shows that compared to the baseline models, the DF-SPM achieves higher prediction accuracy for most cities in China and therefore has better applicability.

In this embodiment, based on FIG. 5, the prediction performance of the DF-SPM, RF, and CLA models for the 264 cities distributed in the eight regions is demonstrated, and the evaluation results of the MAEs of each of the three models in each region are provided. The evaluation results are presented in the bar charts shown in FIG. 7 to further evaluate the model performance. The abscissa denotes the eight regions with significant differences in air quality levels, namely Regions 1 to 8. The left ordinate denotes the number of cities, while the right ordinate denotes the proportion of cities presenting the lowest (optimal) MAE of the DF-SPM. The bar charts with different gray-scales represent the number of cities with optimal prediction results output by the RF, CLA, and DF-SPM models, respectively. The dots denote the proportion of cities in a certain region with the lowest (optimal) MAE of the DF-SPM.

Figure 7:
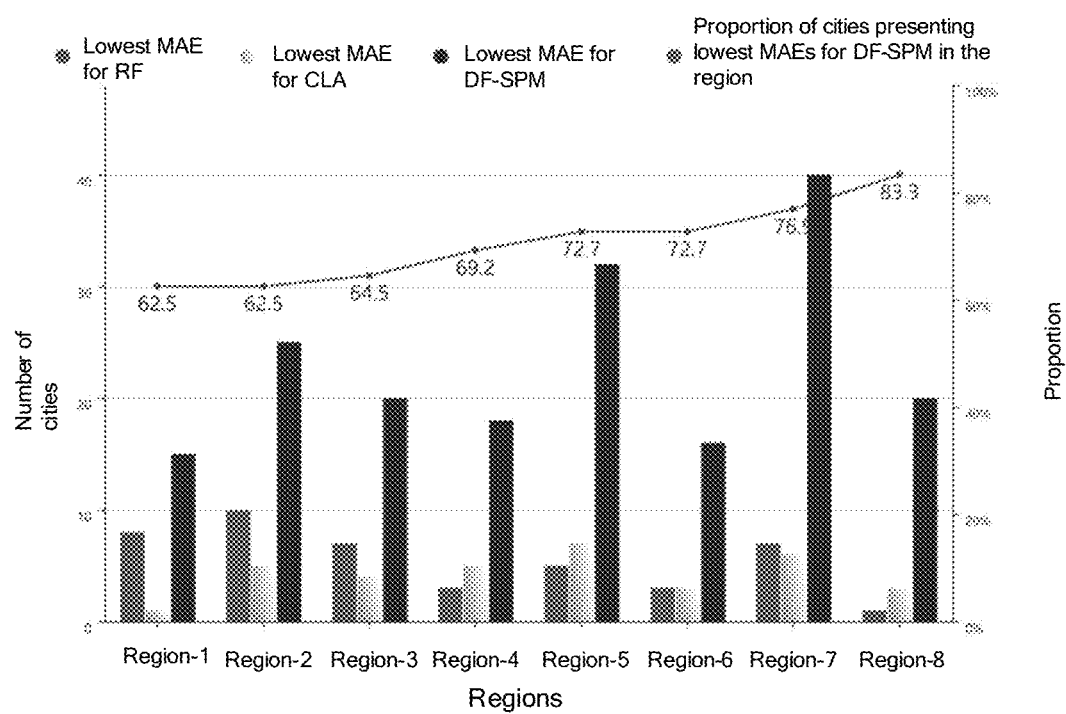
FIG. 7 shows evaluation results of the MAEs for the predictions of the AQIs in the 8 regions by the DF-SPM, RF, and CLA models according to the present disclosure.

According to the bar charts of the 8 regions shown in FIG. 7, the number of cities presenting the lowest MAE of the DF-SPM is significantly higher than the number of cities presenting the lowest MAE of the baseline models RF and CLA. The proportion of cities presenting the lowest MAE of the DF-SPM among the sample cities in the 8 regions indicated by the broken line is 62.5% to 83.3%, with an average proportion of 70.5%. This indicates that the DF-SPM has spatial uniformity in AQI predictions for the sample cities in the regions with different air quality levels, further verifying the high applicability of the DF-SPM for multi-region prediction.

Ablation Test Results According to FIG. 6, the numbers of cities presenting effective predictions by the DFA, DF-PM, and DF-SPM models are in descending order, namely, 49, 132, and 264, respectively. When applied to the prediction of a large number of sample cities, the DFA model using a single threshold search algorithm cannot successfully find the optimal threshold (optimal solution) of the city through training, so the selected prediction result can only be fixed to the value of a single model. Compared to the DFA model using a single threshold, the DF-PM uses a threshold interval strategy, which makes the selected prediction result more reasonable and effective, and to some extent increases the stability of the model. However, the DF-PM does not consider the seasonal distribution feature of the AQI (prior results indicate a significant difference in the AQIs across different seasons). Therefore, the DF-PM does not make seasonal predictions for the annual prediction, and only involves a single threshold interval in the data set, resulting in inaccurate measurement of the AQI fluctuation trends by the algorithm and difficulty in finding the optimal solution. Due to this, the DF-PM fails to successfully search for the OTI for some cities. Therefore, for the prediction of a large number of sample cities, the effectiveness of the DF-SPM is significantly higher than that of the DF-PM and DFA models.

TABLE 3

Statistical results of MAEs of three models based on ablation test

| Model | Fusion model | OTI | Seasonal prediction | Number of cities presenting MAEs smaller than those of the RF/CLA model | Total number of sample cities | Proportion |
|---|---|---|---|---|---|---|
| DFA | ✓ | | | 27 | 264 | 10.20% |
| DF-PM | ✓ | ✓ | | 88 | 264 | 33.33% |
| DF-SPM | ✓ | ✓ | ✓ | 186 | 264 | 70.50% |

Table 3 shows the statistical results of the MAEs of the DFA, DF-PM, and DF-SPM models based on the ablation test. Among the 264 sample cities, there are 27, 88, and 186 cities that present effective predictions by the DFA, DF-PM, and DF-SPM models and MAEs outperforming (smaller than) those of the baseline models, accounting for 10.20%, 33.33%, and 70.50%, respectively. Therefore, the DF-SPM achieves significant results in the strategy of determining model selection based on the OTI and the method of predicting for different regions based on the seasonal feature, and significantly improves the effectiveness and accuracy in predicting the AQI for a large number of cities compared to the ablation models.

What is claimed is:

1. A method for predicting an air quality index (AQI) based on a fusion model, comprising the following steps:
    S1: acquiring and preprocessing historical air quality data; wherein the air quality data comprises an AQI and a pollutant indicator;
    S2: building a differential fusion seasonal prediction model (DF-SPM), training the DF-SPM based on the historical air quality data, and determining an optimal threshold interval (OTT) of the AQI in each season;
    wherein the DF-SPM comprises a random forest (RF) model and a convolutional neural network (CNN) long short-term memory (LSTM)-attention (CLA) model, wherein the RF model and the CLA model are parallel to each other; and
    S3: taking the pollutant indicator before a predicted day as an input into the DF-SPM, taking a predicted AQT of the RF model or the CLA model as an output from the DF-SPM based on the OTI of the AQT in the season of the predicted day, and acquiring an AQI prediction result of the predicted day;
    wherein in step S2, the training the DF-SPM specifically comprises:
    S2-1: dividing preprocessed data into a training set and a test set;
    S2-2: training the RF model and the CLA model separately based on the training set to obtain a trained RF model and a trained CLA model;
    S2-3: performing AQI predictions on the test set respectively by the trained RF model and the trained CLA model, and acquiring a prediction result of the RF model and a prediction result of the CLA model;
    S2-4: classifying the prediction result of the RF model, the prediction result of the CLA model, and real AQT data in the test set on a seasonal scale; and
    S2-5: determining, based on data of each season, the OTI of the AQI in each season by an OTI search method;
    in step S2-5, the determining the Oil of the AQI in any season comprises:
    S2-51: initializing a threshold interval [Down,Up], and setting a maximum threshold interval and a change step size, wherein Down denotes a minimum value of the threshold interval, and Up denotes a maximum value of the threshold interval;
    S2-52: traversing the prediction result $B_i^{RF}$ of the RF model, the prediction result $B_i^{CLA}$ of the CLA model, and the real AQI data in the test set in a same season;
    taking the prediction result $B_i^{CLA}$ of the CLA model is taken as a current model prediction result when the prediction result $B_i^{RF}$ of the RF model and the prediction result $B_i^{CLA}$ of the CLA model are both inside a current threshold interval; and
    taking the prediction result $B_i^{RF}$ of the RF model as the current model prediction result when the prediction result $B_i^{RF}$ of the RF model and the prediction result $B_i^{CLA}$ of the CLA model are both larger than Up or smaller than Down;
    S2-53: storing the current model prediction result is stored in prediction set $R_{Season}$ within the current threshold interval, calculating a mean absolute error (MAE) of the prediction set $R_{Season}$ after the traversing, and storing the MAE in a set $MAE_{Season}^{DF-SPM}$;
    S2-54: modifying the threshold interval is modified according to the change step size, and returning to step S2-52 until the maximum threshold interval is met; and
    S2-55: selecting a minimum MAE in the set $MAE_{Season}^{DF-SPM}$, and taking a threshold interval corresponding to the minimum MAE is taken as the OTI of the AQI in a current season;
    wherein step S3 further comprises: determining the output from the DF-SPM:
    when the predicted AQI of the RF model and the predicted AQI of the CLA model are both inside the OTI of the AQI, taking the predicted AQI of the CLA model as the output from the DF-SPM;
    when the predicted AQI of the RE model and the predicted AQI of the CLA model are both outside the OTI of the AQI, taking the predicted AQI of the RF model as the output from the DF-SPM; and
    when one of the predicted AQI of the RF model and the predicted AQI of the CLA model is inside the OTI of the AQI and the other thereof is outside the OTI of the AQI, calculating a model confidence based on an AQI change feature in a region corresponding to the predicted day, and taking a predicted AQI with a higher model confidence as the output from the DF-SPM.

2. The method for predicting the AQI based on the fusion model according to claim 1, wherein in step S1, the pollutant indicator comprises daily average monitored concentration data of CO, $NO_2$, $O_3$, PM10, PM2.5, and $SO_2$;
    step S1 comprises: preprocessing the historical air quality data to complete missing data:
    when air quality data of consecutive i days is missing, taking an average value $X_{AVG}$ of air quality data of previous i days and next i days as the missing data $X_M$, wherein $X_M=X_{AVG}/2$ when i=1, and $X_M=(X_{M+1}+X_{AVG})/2$ when $2 \leq i \leq 5$;

$$X_{AVG} = \frac{\sum_{P=n-i}^{n-1} X_P + \sum_{N=n+i}^{n+2i-1} X_N}{2i};$$

$X_P$ denotes the air quality data of the previous i days; $X_N$ denotes the air quality data of the next i days; M=n, ..., n+i−1; P=n−i, ..., n−1; and N=n+i, ..., n+2i−1.

3. The method for predicting the AQI based on the fusion model according to claim 2, wherein in step S2, the air quality data of previous 7 days are input into the RF model and the CIA model, and the AQI of a next day is output from the RF model and the CLA model;
the CLA model comprises a CNN module, an LSTM module, an ATTENTION module, and a fully connected layer, wherein the CNN module, the LSTM module, the ATTENTION module, and the fully connected layer are sequentially connected;
the CNN module is configured to extract a feature of input data and flatten the feature into a one-dimensional temporal sequence;
the LSTM module is configured to analyze a feature of an input temporal sequence; and
the ATTENTION module is configured to analyze and highlight key information in the feature of the input temporal sequence.

4. The method for predicting the AQI based on the fusion model according to claim 3, wherein the CNN module is further configured to output a temporal sequence:

$$x_{i,j}^{out} = f_{cov}\left(\sum_{m=0}^{k}\sum_{n=0}^{k} w_{m,n} x_{i+m,j+n}^{in} + b\right)$$

wherein $x_{i,j}^{out}$ denotes a value in an i-th row and a j-th column of the output temporal sequence; $x_{i+m,j+n}^{in}$ denotes a value in an i-th row and a j-th column of an input 7×7 matrix; $f_{cov}(\bullet)$ denotes a rectified linear unit (ReLU) activation function; $w_{m,n}$ denotes a weight in an m-th row and a n-th column of a convolution kernel; and b denotes a bias of the convolution kernel;
the LSTM module is a bidirectional LSTM (Bi-LSTM), and the LSTM module is configured to analyze the input temporal sequence:

$$\vec{i}_t = \sigma(\vec{U}^{(i)}\vec{x}_t + \vec{W}^{(i)}\vec{h}_{t-1} + \vec{b}_i)$$

$$\vec{f}_t = \sigma(\vec{U}^{(f)}\vec{x}_t + \vec{W}^{(f)}\vec{h}_{t-1} + \vec{b}_f)$$

$$\vec{o}_t = \sigma(\vec{U}^{(o)}\vec{x}_t + \vec{W}^{(o)}\vec{h}_{t-1} + \vec{b}_o)$$

$$\vec{\tilde{s}}_t = \tanh(\vec{U}^{(c)}\vec{x}_t + \vec{W}^{(c)}\vec{h}_{t-1} + \vec{b}_c)$$

$$\vec{s}_t = \vec{f}_t \cdot \vec{s}_{t-1} + \vec{i}_t \cdot \vec{\tilde{s}}_t$$

$$\vec{h}_t = \vec{o}_t \cdot \tanh(\vec{s}_t)$$

$$\overleftarrow{i}_t = \sigma(\overleftarrow{U}^{(i)}\overleftarrow{x}_t + \overleftarrow{W}^{(i)}\overleftarrow{h}_{t-1} + \overleftarrow{b}_i)$$

$$\overleftarrow{f}_t = \sigma(\overleftarrow{U}^{(f)}\overleftarrow{x}_t + \overleftarrow{W}^{(f)}\overleftarrow{h}_{t-1} + \overleftarrow{b}_f)$$

$$\overleftarrow{o}_t = \sigma(\overleftarrow{U}^{(o)}\overleftarrow{x}_t + \overleftarrow{W}^{(o)}\overleftarrow{h}_{t-1} + \overleftarrow{b}_o)$$

$$\overleftarrow{\tilde{s}}_t = \tanh(\overleftarrow{U}^{(c)}\overleftarrow{x}_t + \overleftarrow{W}^{(c)}\overleftarrow{h}_{t-1} + \overleftarrow{b}_c)$$

$$\overleftarrow{s}_t = \overleftarrow{f}_t \cdot \overleftarrow{s}_{t-1} + \overleftarrow{i}_t \cdot \overleftarrow{\tilde{s}}_t$$

$$\overleftarrow{h}_t = \overleftarrow{o}_t \cdot \tanh(\overleftarrow{s}_t)$$

$$h_t = \vec{h}_t \cdot \overleftarrow{h}_t$$

wherein left and right arrows on parameters indicate forward and backward directions of the input temporal sequence, respectively; $x_t$ denotes an expression of the output $x_{i,j}^{out}$ from the CNN module in the LSTM module; $i_t$ denotes an input gate, $\sigma(\bullet)$ denotes a Sigmoid activation function; $U^{(i)}$, $W^{(i)}$ denote a weight matrix of an input into the input gate at a current moment and a weight matrix of an output from the input gate at a previous moment, respectively; $h_{t-1}$ denotes an output result at the previous moment; $b_i$ denotes a bias of the input gate; $f_t$ denotes a forget gate; $U^{(f)}$, $W^{(f)}$ denote a weight matrix of an input into the forget gate at a current moment and a weight matrix of an output from the forget gate at a previous moment, respectively; $b_f$ denotes a bias of the forget gate; $O_t$ denotes an output gate; $U^{(o)}$, $W^{(o)}$ denote a weight matrix of an input into the output gate at a current moment and a weight matrix of an output from the output gate at a previous moment, respectively; $b_o$ denotes a bias of the output gate; $\tilde{S}_t$ denotes a neuron; $\tanh(\bullet)$ denotes an activation function, $U^{(c)}$, $W^{(c)}$ denote a weight matrix of an input in a self-cycle state at a current moment and a weight matrix of an output in the self-cycle state at a previous moment, respectively; $b_c$ denotes a bias of the self-cycle state; $h_t = \vec{h}_t \cdot \overleftarrow{h}_t$ denotes a final hidden element of the LSTM module, wherein $h_t = \vec{h}_t \cdot \overleftarrow{h}_t$ is a connection vector between a forward output and a backward output; and $\cdot$ denotes a multiplication operator;
forward and backward output results of the LSTM module are connected through multiplication to form a feature of a temporal sequence output from the LSTM module; and
the ATTENTION module is embedded in a temporal sequence feature analysis process of the LSTM module, and the ATTENTION module is configured to highlight the key information in the feature of the temporal sequence by a Softmax activation function.

5. The method for predicting the AQI based on the fusion model according to claim 1, wherein step S2-1 comprises: taking a model parameter corresponding to the minimum MAE as an optimal parameter for the RF model or the CLA model when the RF model or the CLA model is trained;
wherein the MAE is calculated as follows:

$$MAE = \frac{1}{N}\sum_{i=1}^{N} |y_i - \hat{y}_i|$$

wherein $y_i$ denotes an actual value of the AQI on an i-th day, and $\hat{y}_i$ denotes a predicted value of the AQI on the i-th day.

* * * * *